United States Patent [19]

Reed

[11] 4,339,816
[45] Jul. 13, 1982

[54] CONFERENCING APPARATUS AND METHODS FOR A FREQUENCY DIVISION MULTIPLEX COMMUNICATIONS SYSTEM

[75] Inventor: Joseph Reed, Stamford, Conn.

[73] Assignee: International Telephone and Telegraph Corporation, New York, N.Y.

[21] Appl. No.: 154,243

[22] Filed: May 29, 1980

[51] Int. Cl.$^3$ ............................................. H04J 1/06
[52] U.S. Cl. ....................................... 370/71; 370/70; 370/76; 179/2 EB; 179/84 B
[58] Field of Search ....................... 370/69, 70, 71, 73, 370/76, 57; 179/1 CN, 84 B, 2 EA, 2 EB; 455/34, 49, 53, 54, 56

[56] References Cited

U.S. PATENT DOCUMENTS

| 3,809,815 | 5/1974 | Reed ..................................... 370/71 |
| 3,809,816 | 5/1974 | Reed ..................................... 370/71 |
| 3,864,521 | 2/1975 | Delong ................................. 379/57 |
| 4,031,327 | 6/1977 | Butin .................................... 370/71 |
| 4,107,471 | 8/1978 | Reed ..................................... 370/76 |

*Primary Examiner*—Tommy P. Chin
*Attorney, Agent, or Firm*—John T. O'Halloran

[57] ABSTRACT

A conferencing apparatus for an FDM communications system employs a first available sideband for communication and a second sideband for signaling. Each subscriber in the system has dual receiving and transmitting equipment which enables a subscriber to communicate with any other subscriber. During such communication, a memory at each subscriber location may receive the frequency pair of one subscriber in a connection. Another subscriber desiring to be conferenced will receive the stored frequency pair from the subscriber who is not on proper frequency. This is implemented by a standby receiver and transmitter associated with each subscriber. Upon receipt of this information, the new subscriber can then tune his equipment to store the frequencies as received to enable the new subscriber to be incorporated in a conference mode. The received frequencies are also stored in the new subscriber memory and hence, any additional subscribers contacting parties to the conference will receive information regarding the elected subscriber who is communicating on his properly assigned frequencies to thereby enable a plurality of new subscribers to join in the conference.

19 Claims, 8 Drawing Figures

CONFERENCING APPARATUS AND METHODS FOR A FREQUENCY DIVISION MULTIPLEX COMMUNICATIONS SYSTEM

BACKGROUND OF THE INVENTION

The present invention relates to a conferencing system and more particularly to such a system for use in a frequency division multiplex (FDM) communications system.

The ability to provide conferencing in a telephone switching system offers increased versatility in regard to system use. As explained in the prior art, a telephone communications system which employs frequency division multiplexing provides added advantages to system subscribers in enabling such subscribers to place calls at any time quickly and directly, while guaranteeing access to thereby enable any subscriber to reach any other subscriber, as the systems described are primarily non-blocking systems.

The prior art pertinent to FDM systems is described in U.S. Pat. No. 3,809,815 issued on May 7, 1974 to Joseph Reed (the inventor herein) et al and entitled COMMUNICATION SYSTEM UTILIZING FREQUENCY DIVISION MULTIPLEXING TO LINK A PLURALITY OF STATIONS EACH CONTAINING A SWITCHABLE SYNTHESIZER and U.S. Pat. No. 3,809,816 which issued to Joseph Reed et al on the same day and entitled COMMUNICATION SYSTEM UTILIZING FREQUENCY DIVISION MULTIPLEXING AND A FREQUENCY PLAN THEREFOR.

These patents describe the use of a digital phase locked loop synthesizer to create a series of frequencies which are utilized in dialing a single sideband communication system to enable operation of the same as a switch telephone system. The apparatus and techniques employed are those of single sideband transmission and reception and have frequency division multiplexing to provide channelization. These systems employ a bandpass filter in the transmitting side so as to provide the necessary inversion of transmitting and receiving frequencies required to establish full duplex communications. Such systems operate to select either an upper or a lower sideband generated in a balanced modulator so that the proper frequency is automatically made available. A predetermined frequency plan serves to accomplish the inversion and maintain the relationship between the intermediate frequency which is used in the transmitting side and the transmission band. This frequency plan is fully described in U.S. Pat. No. 3,809,816.

In any event, these systems have certain limitations in operation. Referring to U.S. Pat. No. 4,107,471 entitled FREQUENCY DIVISION MULTIPLEX COMMUNICATION SYSTEM issued on Aug. 15, 1978 to Joseph Reed and assigned to the Assignee herein, there is shown an improved FDM system which eliminates many of the disadvantages found in the above noted prior art systems. In this system, a receiver IF frequency replaces the direct synchronous detection scheme of the prior art. In this system, two separate intermediate frequencies are employed in such a manner that the difference between transmitting and receiving frequencies thus generated is the difference between the two separate intermediate frequencies, thereby providing the capability of using independent sideband transmission instead of single sideband transmission. This enables additional channel capacity as well as resulting in a great improvement in receiver sensitivity with an increase in transmission efficiency. In this approach, a single synthesizer is employed and a single bandpass filter selects the appropriate upper or lower sidebands of transmission for full duplex operation. Accordingly, one of the two available sidebands is then used for communication, while the other sideband is available for signaling, monitoring, break-in or other telecommunications functions.

As indicated in U.S. Pat. No. 4,107,471, the apparatus depicted and which uses independent sideband transmission, can be adapted to conferencing systems. In any event, such conferencing systems are extremely desirable, but before any such technique can be implemented, one has to provide adequate structure as well as a predetermined operating plan to enable efficient system use.

Conferencing techniques which are employed in present switching systems provide extreme difficulty when implemented. For example, in a conventional telephone system, it is possible to connect three or four subscriber pairs in parallel so as to permit a three or four way conference by utilizing a bridging technique. In such techniques, the subscribers must be located on the same local switch or relatively close to one another. In these techniques, the energy generated by each subscriber's microphone must be shared between a plurality of receivers. The lower energy received at each receiving point serves to limit the number of subscribers permitted in the conference because the received signals have less and less energy as a function of the number of subscribers. Furthermore, the mismatch generated by the bridging circuit further aggravates the losses, thus causing the received signals to be even less audible. It is also understood that if a subscriber is located at a considerable distance from other subscribers to the conference, his apparatus would present a different impedance than the others and hence, he would receive less energy than the others, making the system unacceptable.

In order to circumvent such problems, the prior art employed four wire transmission. In such systems, one wire pair is used by each subscriber to transmit and another wire pair is used by each subscriber to receive. In this manner, an amplifier may be inserted in the receive or transmit paths to enable amplification of each signal so as to make up for the sharing of energy among subscribers. These systems require that a standard two wire circuit be converted to a four wire circuit and then applied to the amplifiers and combined to provide a conferencing function.

Based on practical restraints in regard to amplification and so on, the number of interconnected subscribers in a conference is usually limited to six. In any event, by using conference briges in cascade, a greater number of subscribers can, in fact, be accommodated. In spite of such techniques, these methods still suffer from the fact that subscribers at various distances may require different amplification factors as coupled to the bridge circuits, thus causing deterioration in the ratio of signal to noise.

The techniques as described above are cumbersome and difficult to implement based on a random conferencing scheme. Hence, in such systems, it is usual to use manual operator intervention in order to properly implement a conference between a plurality of subscribers. If automatic operation of conferencing is desired, the system implementation becomes extremely difficult and complex, as will be discerned upon a review of the prior art.

As will be explained, systems employing FDM utilize four wire transmission. In such systems, one frequency is used for transmission, while a second frequency is used for reception. Furthermore, since the transmission is on a single sideband basis, the signals within the cable add in a linear manner and do not interact with each other to form distortion products. In such systems, there are also no carrier signals to cause beats and/or whistles because of slight frequency differences between various transmitters operating at the same nominal frequency.

As will be explained, the effect of these system characteristics is to enable the subscribers to arrange an impromptu conference. However, the extent of the conference is severely limited according to prior art techniques, as will be explained.

It is therefore an object of the present invention to provide an improved system enabling a plurality of subscribers to engage in a conference, while circumventing many of the disadvantages of the prior art, as above explained, and further specifying a conferencing format which enables a great many subscribers to participate without the attendant problems existing in prior art systems.

SUMMARY OF THE INVENTION

Conferencing apparatus is used in a frequency division multiplex communication system, which system includes a plurality of subscriber stations coupled to a transmission path and each of an assigned transmitting and receiving frequency. Each station further has a selectable transmitter and receiving section in parallel with a first transmitter and receiver adapted to transmit and receive at the frequencies assigned to that station. The frequency plan is such that each station is associated with its own assigned frequencies and a plurality of assigned frequencies can be accommodated simultaneously on the transmission path. To implement conferencing, each station further has a memory which is capable of storing any frequency pair of any other subscriber. Accordingly, if a subscriber wishes to be connected to an existing communications path between two different subscribers, in order to enter a conference, he may access one of the subscribers, who has stored in its memory, the frequencies assigned to the other subscriber he is communicating with. In this manner, the third or any additional subscriber can retune his transmitter and receiver to communicate with the subscriber whose frequencies have been stored. According to the apparatus and methods to be described, one subscriber out of a plurality of conference subscribers always serves as the nexus in the conferencing mode, as this subscriber is elected as the one of the plurality and is operating on his basic assigned frequencies.

DETAILED DESCRIPTION OF THE INVENTION

Figure 1:
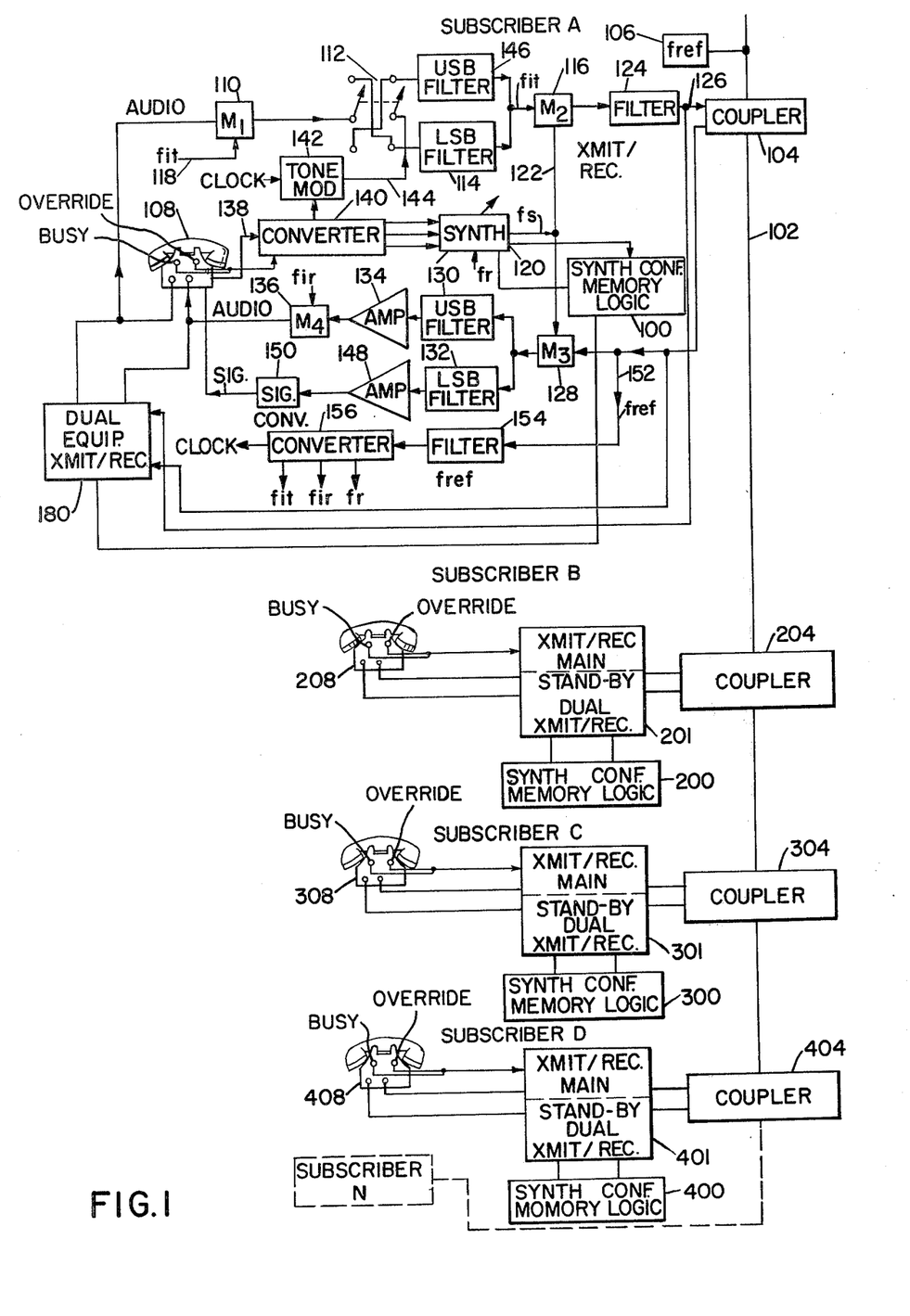
FIG. 1 is a block diagram of a multiple subscriber FDM system employing conference apparatus according to this invention.

Referring to FIG. 1, there is shown a frequency division multiplexed telecommunication system having conferencing capability. The system depicts four subscribers designated as A,B,C and D, each having identical receiving and transmitting equipment, which equipment, as will be explained, is present at each subscriber terminal in dual form.

The system format and operation is that employed and shown in U.S. Pat. No. 4,107,471 and the techniques for reception and transmission are fully described in the above noted patent. In any event, in order to fully understand the nature of this system operation, a description of the pertinent structure will be afforded by referring to FIG. 1. In this description, a detailed block diagram is shown for one set of receiving and transmitting equipment for subscriber A and the dual equipment, as will be explained, is shown generally in block format.

In order to fully recognize the fact that a plurality of subscribers may effectively utilize the system, there is shown an additional subscriber location designated as subscriber N to characterize the fact that the system is applicable to be used by a great number of subscribers (a thousand or more).

As shown in FIG. 1, a subscriber A is connected to other subscribers via a coaxial cable 102 by means of a coupler 104, which may be a magnetic coupler or other device, many of which are well known in the art. A reference frequency generator 106 is shown coupled to the coaxial cable or transmission path and is isolated from the transmitting band of each subscriber, while the reference frequency is common to all subscribers coupled to the cable 102.

There is shown a typical telephone subset 108 which operates to generate audio signals in a well known manner. These signals are coupled to a mixer 110 and via a switch 112 to a lower sideband (LSB) filter 114 having an output coupled to a mixer (M2) 116. The apparatus described serves to generate a lower sideband adjacent to a virtual carrier centered at frequency $f_{it}$, where $f_{it}$ is the transmitter intermediate frequency coupled to mixer 110 via line 118. The mixer 110 is a balanced modulator, which devices are also well known in the art.

There is shown a frequency synthesizer 120 which is capable of being tuned either in a stepped or continuous manner. Frequency synthesizers as 120 are also well known in the art and many suitable examples exist. The synthesizer operates to generate a frequency $f_s$ which is coupled to mixer 116 via the line 122. The resultant output frequencies from mixer 116 are the sum and difference frequencies of $f_s$ and $f_{it}$ and are coupled to the filter 124 having a bandwidth characterized in that only $f_s - f_{it}$ is coupled out on line 126 to coupler 104.

An upper sideband signal containing the audio information adjacent to the virtual carrier frequency is then coupled to the cable 102. This is due to the inversion of sidebands which occur when the subtractive terms at the receive mixer is the transmitted one and that is the reason for the selection of the appropriate sideband filter. The frequency of the upper sideband signal is selected to be equal to the receiver frequency of a receiving subscriber, such as subscriber B, for example.

At this point, it is noted that subscriber B contains the exact apparatus as depicted for subscriber A and subscriber B interfaces with a coupler 204, which is of the same configuration and operation as coupler 104. Accordingly, a receive signal equal to the transmitting signal of subscriber B is coupled to mixer 128, which signal is thence coupled to an upper sideband filter 130 and a lower sideband filter 132 on the receiving side of the calling subscriber A circuit.

The output of the mixer 128, the receiver intermediate frequency $f_{ir}$ is selected by upper sideband filter 130, amplified by amplifier 134 and detected by detector 136. Detector 136 has a second input, the receiving IF frequency $f_{ir}$. Simultaneously, a second communication path is established such that signals from subscriber set 108 are coupled via line 138 to a converter 140, which may comprise a dial pulse to register converter and operates to set the synthesizer 120 to the proper synthesizer frequency $f_s$ and which signals are at the same time modulated by a clock in tone modulator 142. The output of the tone modulator 142 is coupled via line 144 through switch 112 to an upper sideband filter 146. The output of filter 146 is coupled to the coaxial line 102 via the modulator or mixer 116 and filter 124 and represents a lower sideband adjacent to the virtual carrier. This is due to the inversion of sidebands which occur when the subtractive term at the receive mixer is the transmitted one and is the reason for the selection of the appropriate sideband filter.

At subscriber B at the receive side, any low sideband signals present are reduced to the receiver intermediate frequency $f_{ir}$ by a mixer identical to mixer 128 and thence propagate through a lower sideband filter as 132, are amplified by an amplifier as 148, converted to an audio frequency by converter 150 and utilized to provide ringing and so on for the subset 208 associated with subscriber B. Lower sideband filter 132, amplifier 148 and signal converter 150 for subscriber A on the receiving side perform a like function for subset 108 in regard to ringing and so on.

The reference frequency fref is coupled to the line 152 from the coupler 104 and is filtered by filter 154. The output of filter 154 is coupled to a signal converter 156 wherein amplification and suitable conversion are implemented to provide clock frequencies $f_{it}$, $f_{ir}$ and $f_r$, which frequenices are the reference frequencies for the calling subscriber station A. Thus, all subscribers as A,B,C,D and N derive their respective reference frequencies from the same source as explained in U.S. Pat. No. 4,107,471.

A typical receiving subscriber as B coupled to coaxial line 102 via coupler 204 is of identical configuration to the above noted calling subscriber A and transmits and receives in the identical manner. Hence, each subscriber as C,D, and N are are of like configuration as subscribers A and B; with each such additional subscriber individually coupled via individual couplers such as couplers 304, 404, to line 102.

Essentially, as indicated in the above noted patent, a conferencing scheme can be employed in a simple and efficient manner with the above noted operation for each subscriber with the following additional equipment:

As shown in FIG. 1, subscriber A has a module labelled dual equipment (transmit/receive). This module 180, as can be seen from FIG. 1, is in parallel with the subset 108 at an input side and with the coupler 104 at an output side. The module 180 contains a complete dual of the apparatus shown for subscriber A. As will be noted, it is not necessary to fully repeat each structure, as much of the structure can be eliminated, as will be explained. In any event, for purposes of clarity and a complete understanding of the operation, it will be assumed that the module 180 contains the components designated in detail for subscriber A.

Also shown in the FIG. 1 is a module 100 designated as synthesizer and conference memory and logic. As will be explained, the module 100 contains a memory and memory control and logic circuitry useful for storing information pertinent to conferencing techniques and for control of the synthesizer 120. Each subscriber stage as B,C and D contains a dual transmit and receive equipment, which is of the same general configuration as that equipment shown in detail for subscriber A.

With the above noted operation in mind, reference will now be had to FIGS. 2 to 8 to clearly and completely describe conferencing ability of the system based on a unique format and operation.

Figure 2:
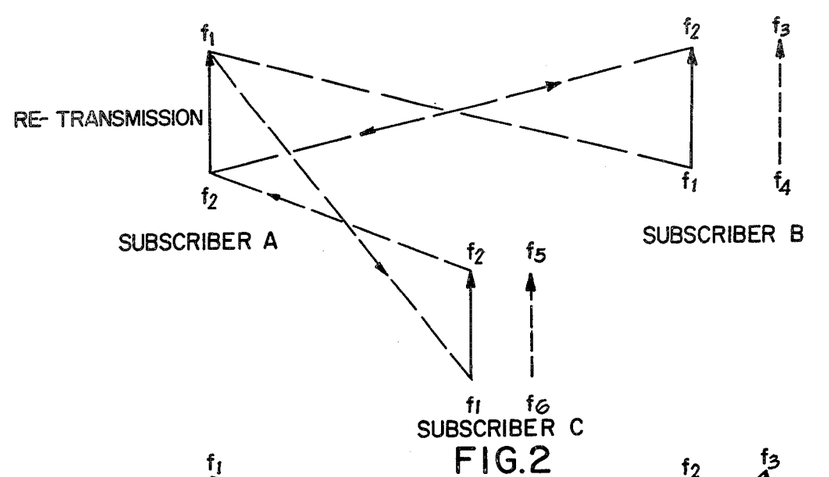
FIG. 2 is a schematic diagram showing a conferencing setup according to the prior art.

First referring to FIG. 2, each arrow represents a subscriber stage with the arrowhead indicating the transmitting frequency. Hence, subscriber A has a transmitting frequency of $f_1$ and a receiving frequency of $f_2$. Subscriber B has a transmitting frequency of $f_3$ and a receiving frequency of $f_4$. Subscriber C has a transmitting frequency of $f_5$ and a receiving frequency of $f_6$. This format is explained in detail in U.S. Pat. No. 4,107,471, as well as U.S. Pat. Nos. 3,809,815 and 3,809,816.

Accordingly, $f_1-f_2$, $f_3-f_4$ and $f_5-f_6$ are associated in pairs with a fixed frequency difference between the transmit and receive frequencies. As explained, these frequencies are generated by the setting of the frequency synthesizer 120 at each subscriber stage or station.

In regard to a prior art system as shown, for example, in U.S. Pat. No. 4,107,471, when subscriber B wishes to call subscriber A, he resets his synthesizer so that his transmit frequency is the same as A's receive frequency ($f_2$). At this point, subscriber B's receive frequency is automatically set to $f_1$. The subscriber B, in calling subscriber A, has left his own frequencies (dashed arrow) and is now communicating on a four wire basis with subscriber A at the transmit frequency of $f_2$ and the receive frequency of $f_1$. In FIG. 2, communications now take place over the paths indicated by dashed lines between subscriber A and subscriber B and in the directions indicated by the arrows associated with the dashed lines.

Now assume that subscriber C wishes to talk with subscriber A. Subscriber C resets his frequencies in the same manner as did subscriber B, and hence, he resets his transmit frequency to $f_2$ and his receive frequency is automatically set to $f_1$.

From FIG. 2 is is seen that subscriber A may hear both subscribers B and C and subscribers B and C may hear subscriber A. In any event, subscriber B and subscriber C cannot hear one another. This is clear from FIG. 2. However, if subscriber A desires to, he may at his option, connect the audio signals within his equipment so as to retransmit either B or C or both so that a full three way conference may be established. This is accomplished by subscriber A switching a portion of his own receive signal to his own transmitter. Hence, it can be seen that as long as additional subscribers continue to call A, they will enter the conference as full participants.

Figure 3:
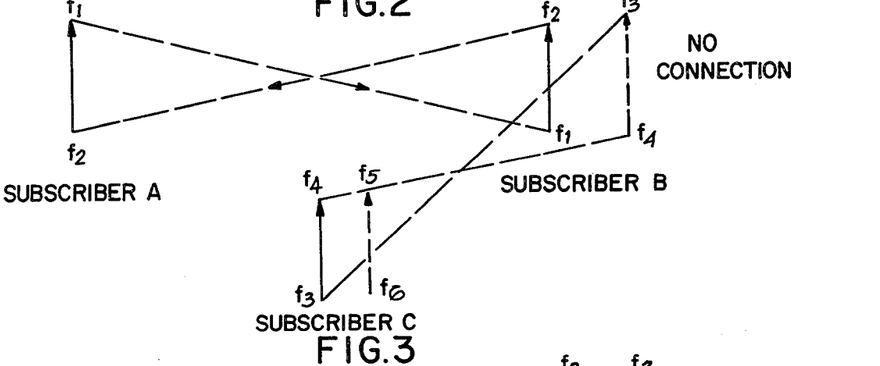
FIG. 3 is a schematic diagram of another conferencing arrangement according to the prior art.

However, if subscriber C had attempted to call subscriber B instead of subscriber A, then the situation shown in FIG. 3 would occur. In FIG. 3, subscriber B is communicating with subscriber A as in FIG. 2. Subscriber C would now set his transmit frequency to $f_4$ and his receive frequency would automatically be set to $f_3$ to communicate with subscriber B. Since subscriber B is not operating on his own original frequencies, subscriber C would not be able to establish a connection with subscriber B and would simply not be able to enter the conversation. Subscriber C would receive a self-generated busy signal but he would be unable to override the signal as shown in FIG. 3. Furthermore, it is, of course, apparent that subscriber C would have no idea to whom subscriber B is actually communicating with based on the fact that a typical switching system employing this FDM technique may employ thousands of different subscribers with thousands of different assigned frequencies.

Thus, as indicated in the above noted patent, U.S. 4,107,471, each subscriber as A,B, C . . . N is supplied with dual equipment as 180. Hence, all subscribers have a complete redundant equipment which operates at the fixed frequencies assigned. For example, subscriber B's dual equipment would operate at $f_3$ and $f_4$, C's dual equipment at $f_5$ and $f_6$ and A's dual equipment at $f_1$ and $f_2$. As shown in FIG. 1, the dual equipment is parallel so that a calling subscriber could be heard and retransmitted.

In any event, there is a problem which was not indicated in the above noted patent and which seriously effects system capability.

Figure 4:
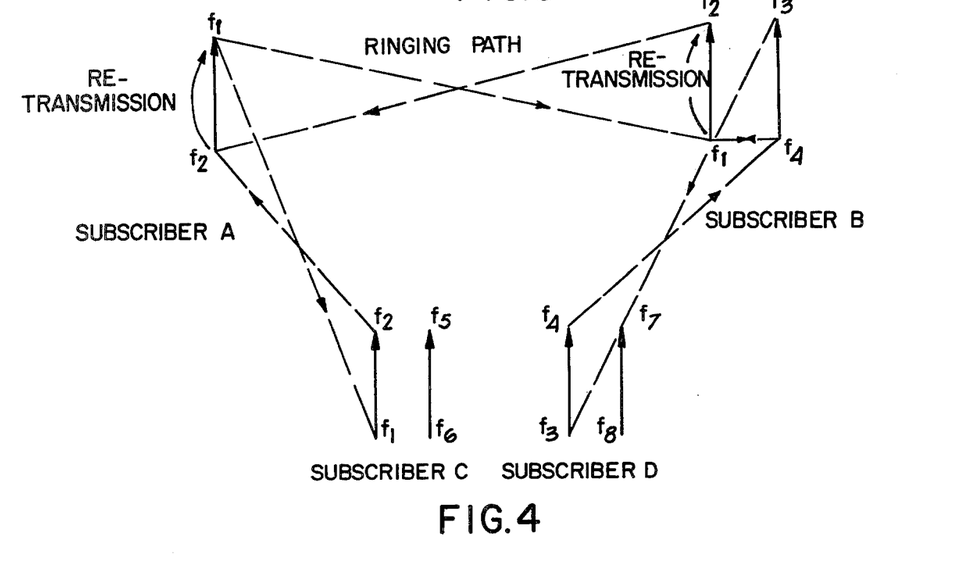
FIG. 4 is a schematic diagram of a conferencing arrangement affording an undesirable closed loop operation according to prior art.

Referring to FIG. 4, there is shown a conferencing setup between four subscribers A,B,C and D, where subscriber D is assigned frequencies $f_7$ and $f_8$ and corresponds to subscriber D shown in FIG. 1. Subscriber D, according to the prior art format, if entering the system, can cause a closed loop to be set up. This closed loop would cause system oscillation to take place, thus completely making the system unuseable and inoperable. Hence, in FIG. 4, each subscriber has dual equipment.

As shown in FIG. 4, subscriber C is communicating with subscriber A as is subscriber B and a three way conference is set. Subscriber D can, of course, call subscriber B as subscriber B's frequencies $f_3$ and $f_4$ are available via his dual transmit and receive equipment. Hence, subscriber D makes a connection to subscriber B. When subscriber B receives the frequency $f_4$ from subscriber D, this is immediately converted to $f_1$ which sets up a retransmission as shown. The retransmission is further propagated back to subscriber D and a loop or a ringing path is formed and hence, will render the total system completely inoperable if, in fact, dual equipment is employed as alluded to in U.S. Pat. No. 4,107,471.

Thus, the present system, as will be explained, completely eliminates the above noted problem, while further permitting a large number of subscribers to enter a conference network at will and to eliminate any chance of formulating a ringing loop.

As indicated in FIG. 1, each subscriber as A,B . . . N has equipment designed to transmit and receive on both upper and lower sidebands. According to the teaching of U.S. Pat. No. 4,107,471, the lower sidebands are assigned to signaling only while the upper sidebands are assigned to communication only.

In this system, each subscriber further has a sufficient temporary digital memory as 100 to 400, which memory is provided to store certain information at each subscriber location during the progress of a call, as will be described. The memory 100 may be a readily available integrated circuit memory or may comprise a suitable length storage register or any other typical memory device well known and available in the prior art.

Figure 5:
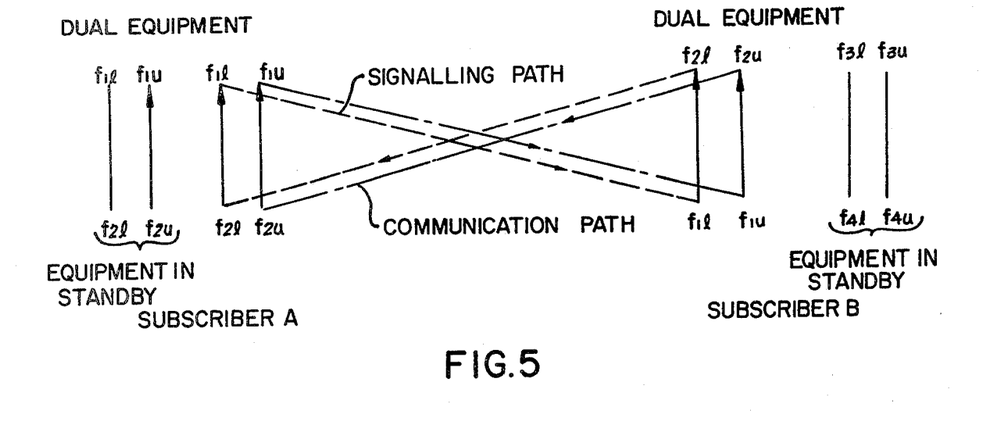
FIG. 5 is a schematic diagram showing a subscriber connection according to the present invention.

Referring to FIG. 5, there is shown a format which is employed in the present system, as will be described. When subscriber B wishes to call subscriber A, he sets one of his two dual equipments via the synthesizer to the proper frequency as before. As indicated above, the lower sidebands are employed for signaling, while the upper sidebands are employed for communication only and hence, FIG. 5 shows two arrows for each frequency pair designated as $f_{2L}$ and $f_{2u}$ where L is for low sideband and u is for upper sideband and so on. Upon subscriber B setting his frequencies to $f_2$ and $f_1$, he makes contact on the lower sideband L with subscriber A, where a signal query is sent to subscriber A and received by subscriber A through the filter 132 of FIG. 1.

Subscriber A then answers the signal indicating busy or not busy. Subscriber A may do this by pressing a button on his subset designating a particular busy frequency which is converted in converter 140 and transmitted as explained above. Subscriber B will hear the busy signal and if subscriber B is of a higher priority than subscriber A, he may wish to override the busy tone sent by A. In this manner, subscriber B will then press a button on his subset 208 which is an override signal. This signal will immediately inform subscriber A that subscriber B is entering the conversation. If subscriber A is not busy, then subscriber B will hear a ringing tone as is conventional and subscriber A will hear ringing in the subset 108.

In any event, when subscriber B hears a ringing tone or in the event of an override, these conditions cause the memory 200 associated with subscriber B to receive a signal to be stored, which signal is indicative of the original frequency code necessary for subscriber B to communicate with subscriber A. This code is immediately emplaced in the memory 200 and stored there for the remainder of the call. If the override takes place or subscriber B is connected to subscriber A, then the same memory action occurs. Hence, when subscriber B leaves his own assigned frequency pair, his equipment will automatically enter two items into the memory 200. The first item is the fact that subscriber B is not communicating on his own frequencies and the second items are the frequency pair numbers that B is using, namely that pair associated with subscriber A. It is, of course, understood from FIG. 5 and obvious that the dual equipment of subscriber B remains tuned at his assigned frequency $f_3$ and $f_4$ or the corresponding upper and lower sidebands of $f_3$ and $f_4$.

The memory 200, as indicated, is a conventional format and can be the same exact memory one might normally employ to set the frequency synthesizer 120. As such, frequency synthesizers with memory tuning or with storage capabilities are well known in the art and many examples of suitable equipment exist.

Hence, in FIG. 5, subscriber B is communicating with subscriber A via the upper sideband path $f_{2u}$ and $f_{1u}$, while signaling takes place on the lower sideband path $f_{1L}$ and $f_{2L}$.

If a third subscriber C wishes to enter the network, he proceeds to dial one of the subscribers A or B. It is understood that the new subscriber C need not be aware when dialing, of the fact that subscriber A or subscriber B are in communication. In the first instance, signaling will take place as described above as shown in FIG. 6. Hence, subscriber C contacts subscriber A through the lower sideband signaling path and can be incorporated into the network as described above by an override or otherwise.

Figure 6:
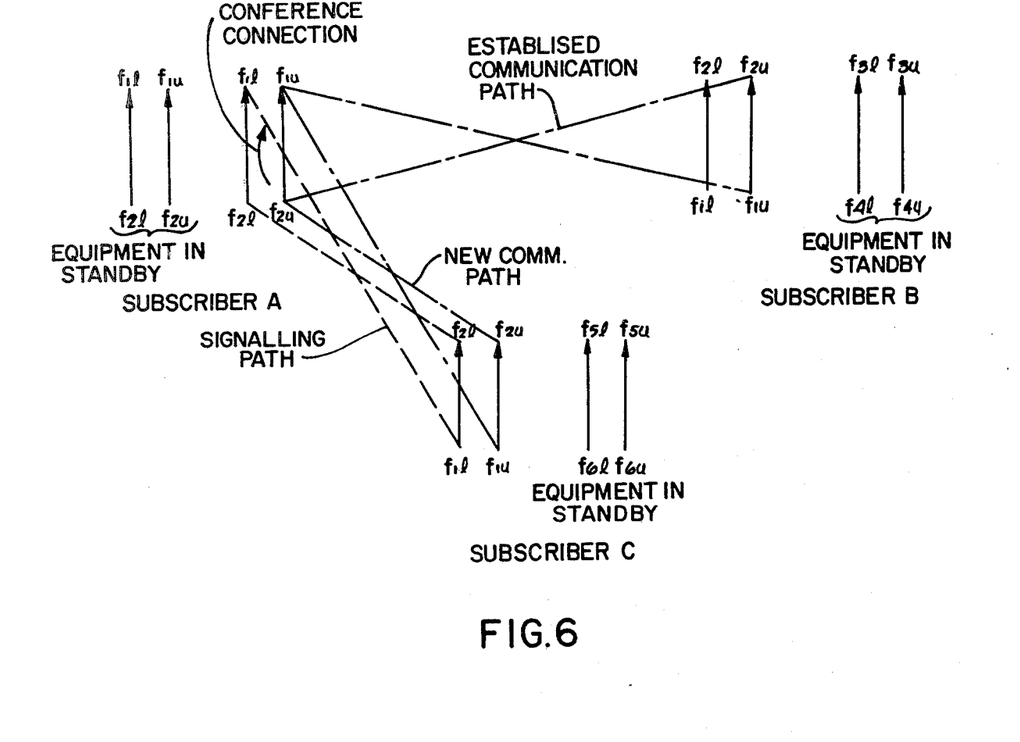
FIG. 6 is a schematic diagram necessary to understand a conferencing setup according to this invention.

As one can ascertain from FIG. 6, there is no problem in connecting subscriber C to subscriber A and hence, performing conferencing as, for example, shown in FIG. 2. If, however, subscriber C contacts subscriber B on the signaling sideband, he would receive information from subscriber B as follows:

(1) That subscriber B is not operating on his assigned frequency;

(2) He would then receive the frequency pair as stored in the memory associated with subscriber B and hence, he would be informed that subscriber B is communicating with subscriber A.

Subscriber C, upon receiving the frequency pair at which subscriber B is operating, would then, if desired, reset his synthesizer to transmit to subscriber A. This communication takes place on the standby channels or on the dual equipment which is always at the fixed frequency for each subscriber.

Hence, subscriber C can provide communications because his signal would have found receptive equipment which is the dual equipment at the B location, as well as the dual equipment at the A location. Any signals transmitted by C would not interfere with the on-going communications since they were transmitted on separate channels. Accordingly, subscriber C, being informed by subscriber B of the frequency pair associated with subscriber A, would connect to subscriber A as shown in FIG. 6. Upon so doing, the frequencies associated with subscriber A are stored in memory 300 associated with subscriber C.

Figure 7:
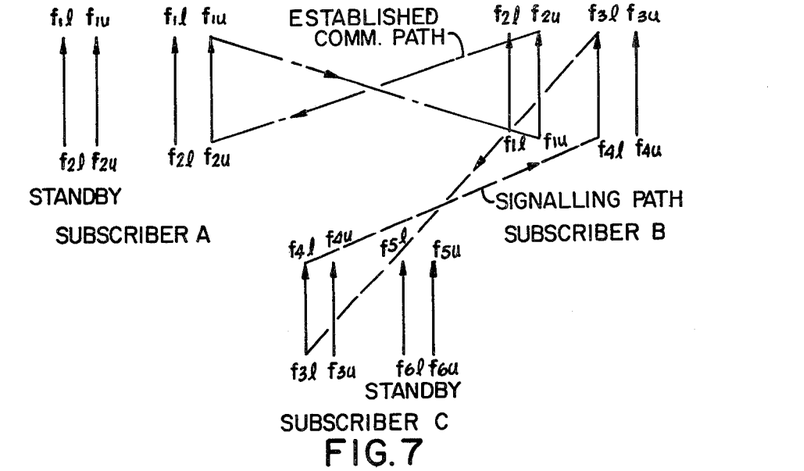
FIGS. 7 and 8 are schematic diagrams showing a conferencing sequence as implemented according to the present invention.
Figure 8:
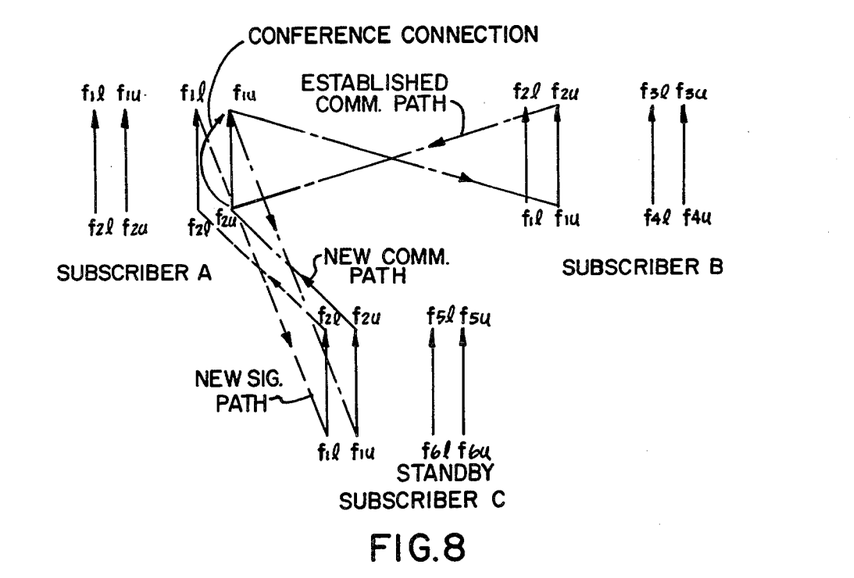

Referring to FIGS. 7 and 8, the sequence of events occurring is described.

In FIG. 7, there is shown subscriber C communicating with subscriber B on the standby equipment via the signaling path. The call would be rejected if an override is sent and then a retune signal would be sent from subscriber B to subscriber c instructing subscriber C to retune to subscriber A. Upon returning to subscriber A, the signal connection as shown in FIG. 8 would occur and operation to the system is as that shown in FIG. 6.

It is now noted that full standby equipment as 180 are not needed at subscribers A,B, and C. Accordingly, any one channel is used for signaling so in this conferencing scheme, one requires only the lower sideband channel as indicated by $f_{1L}-f_{2L}$; $f_{3L}-f_{4L}$ and $f_{5L}-f_{6L}$ respectively. This standby equipment will remain on assigned frequencies to receive calls while the main channels are busy.

It is, of course, understood that full equipment may, in fact, be employed to offer greater versatility to the overall system, as the major components associated with the system can be implemented by integrated circuit techniques including large scale integration and hence, the addition of a complete dual equipment for standby equipment, as above explained, will offer no significant cost increase with the understanding that the redundancy provided actually can serve to increase system reliability and improve system operation.

With the above description in mind, if another subscriber such as subscriber D calls either B or C, he will automatically receive information to enable him to retune to communicate with subscriber A, since both subscribers B and C contain A's frequency in memory. Therefore, this effect is to have all additional subscribers enter the network through subscriber A. In this manner, the possibility of establishing a closed loop is eliminated, since subscriber A always becomes a conferencing central subscriber and all other subscribers can only be routed through subscriber A.

The above description assumes upper sideband communication and lower sideband signaling which, as indicated, is fully described in U.S. Pat. No. 4,107,471. It is, of course, obvious that this action could be reversed or a mixture may be used, as above explained. While full dual equipment can be employed, that is also unnecessary. In this manner, the fixed section of the dual equipment as 180 need not be equipped to operate as a communications link. In that case, both sideband generators are not needed and should sideband reversal be required, it can be obtained by means of several well known techniques.

Based on the above noted description and referring to FIG. 1, a simple explanation of operation will be given so that one may determine the operating characteristics of the system, in regard to the components specified in FIG. 1.

Assume that subscriber B is in communication with subscriber A as described above and subscriber C decides to call subscriber B. Also assume that subscriber B is operating as shown in FIG. 2 and hence, is communicating with subscriber A via frequencies $f_1$ and $f_2$. Subscriber C will transmit the frequencies $f_4$ associated with subscriber B as shown, for example, in FIG. 7. As indicated, subscriber B, based on his dual transmit and receive equipment, will receive a signal via the lower sideband filter 132, which signal is converted by converter 150 and hence, appears as an audible signal in the subset of subscriber B. Subscriber B, upon receipt of the signal from subscriber C, then transmits to subscriber C on the lower sideband frequency $f_{3L}$, the information indicating that he is not operating on assigned frequency, as well as information that he is communicating with subscriber A, which information is stored in the memory 100. Subscriber C receives this information on frequency $f_{3L}$ and via the lower sideband filter and the signal converter. The information is converted and decoded to therefore inform subscriber C of the frequency pair being used or that pair assigned to subscriber A. If subscriber C desires, he can now call subscriber A and be connected to the system either in an override mode or with the permission, as explained above, of subscriber A. If a connection is made, then subscriber C also has stored in its subscriber station memory 300, the assigned frequency pair of subscriber A, who is the nexus of the conferencing network and hence, any calls to B or C will automatically provide the same sequence of events and therefore additional subscribers such as D or N can be connected in conference as well.

The above described techniques in conjunction with the structure shown in FIG. 1 are easily and simply implemented. For example, the signal converter 150 in both the main receiving and transmitting equipment and the standby dual equipment can recognize the signaling tones by ordinary and conventional selective amplifiers and display the tone either by audio or visual means. The busy signals as well as the override signals are easily generated by the converter 156 or by the synthesizer 120 and hence, any suitable tones or combinations of tones can be implemented to provide the necessary signaling, all of which occurs on the lower sideband as compared to communications which occur on the upper sideband. It thus should be obvious to one skilled in the art that the implementation of the system is extremely simple and essentially, the basic structure, with the exception of the memory and the standby units, is, in fact, available in the structure depicted in U.S. Pat. No. 4,107,471.

In summation, a FDM system is described which automatically references all calls to that subscriber who is operating on his assigned frequency, as subscriber A, and he is made the nexus of the conferencing network. Based on the system operation, signaling is accomplished on a non-interfering basis of communication.

With the above noted format in mind, it is possible to preprogram a conference and have a number of subscribers called into a preprogrammed conference in a simultaneous action. As an example, if A wishes to call B,C and D into a conference, he dials a predetermined number or code, which code contains one of the stations, as any selected subscriber, as the central subscriber. Once this is done, his equipment will dial each subscriber in sequence instructing the subscribers to reset their main equipment to the selected station and hence, each subscriber, upon so doing, will cause the frequencies associated with the selected station to be stored in memory. In this manner, the control signal will cause the selected station to operate in the retransmitted mode and the system will then ring each subscriber necessary to complete the conference. The technique of doing so is well within the ken of those skilled in the art and can be accomplished by simple logic addition to the circuit described.

It is further noted that preprogrammed conferencing techniques can be stored in the memory 100, if desired, and hence, a preprogrammed conference can be initiated by a subscriber by the depression of a single button on his subset, which will access a stored memory control signal to be transmitted for a conference setup.

It is, of course, noted that a single synthesizer as 120 can be employed to generate the standby frequencies and hence, make the same available at each subscriber location.

It is, of course, noted that the system inherently is capable of transmitting and receiving both communication and signaling signals simultaneously without interference as described in detail in U.S. Pat. No. 4,107,471, as well as how the frequencies are selected and operate according to the subscriber communication frequency plan.

While the present invention has been described in connection with a preferred embodiment, it is to be understood that additional structures, modifications and applications will become obvious to those skilled in the art and are included within the spirit and scope of the invention as set forth by the following claims.

I claim:

1. A conferencing apparatus for use in a frequency division multiplex communication system, comprising: a plurality of subscriber stations coupled to a transmission path, each of said stations including a first transmitter and a first receiver having an assigned transmitting and receiving frequency and a second transmitter having selectable transmitting frequencies associated with a second receiver with said second transmitter and receiver in parallel with said first transmitter and receiver, said assigned frequencies having a fixed frequency difference therebetween corresponding to the difference in the transmitter and receiver intermediate frequencies, mixer means at each station operative to mix a predetermined frequency with said intermediate frequencies to derive an independent sideband signal comprising an upper and lower sideband outputs such that one sideband thereof contains communication information and one sideband thereof contains signaling data, each station including bandpass filter means at said transmitters and said receivers for rejecting undesired mixing products, said transmission path for receiving said filtered independent sideband signal with said path containing a common reference frequency to permit simultaneous communications and signaling between subscriber stations, each station further containing a memory adapted to store therein data indicative of a subscriber station to which a selected subscriber station is communicating with, and logic means operative to transmit said stored data to any other subscriber station to enable said any other station to select said transmitting frequency according to said data as stored, whereby any selected number of said subscriber stations can communicate with each other in a conference mode with said selected subscriber being the nexus of said conference mode.

2. The conferencing apparatus according to claim 1 wherein each station further includes a frequency synthesizer for generating said predetermined frequency and said selectable transmitting frequency.

3. The conferencing apparatus according to claim 1 wherein communications between subscribers is provided on the upper sideband output of said mixer means and signaling on the lower sideband output of said mixing means.

4. The conferencing apparatus according to claim 1 wherein each subscriber station further includes busy indicating means for transmitting a busy signal to said any other subscriber station indicative of the status of said station as to whether the same is engaged in communication.

5. The conferencing apparatus according to claim 1 wherein said first transmitter and receiver is adapted to respond to said lower sideband for reception and transmission of only signaling data.

6. The conferencing apparatus according to claim 1 wherein said transmission path comprises a coaxial cable.

7. In a frequency division multiplex communication system of the type having a plurality of subscriber stations each including a first transmitter and a first receiver coupled to a transmission path, with said transmitter and receiver having respectively an assigned frequency for transmitting and receiving, with said frequencies being related by a fixed frequency separation corresponding to the differenced in transmitter and receiver intermediate frequencies, mixer means for mixing a predetermined frequency with said intermediate frequencies to derive an independent sideband signal comprising an upper and a lower sidebands such that one sideband thereof contains communication information and the other sideband contains signaling data, filter means at said transmitter and said receiver having a bandpass of approximately twice the difference in frequency between said transmitter intermediate frequency and said receiver intermediate frequency, for rejecting undesired mixing products such that the desired sideband signal is selected, means for coupling said independent signal onto said transmission path, with said path coupled to a common reference frequency means to permit simultaneous signaling and communications between said subscriber stations, the combination therewith of conferencing apparatus at each subscriber station to enable a first plurality of subscribers to communicate in a conference mode without feedback oscillations, each of said stations further comprising:

a second transmitter and a second receiver coupled to said transmission path and adapted to transmit and receive respectively a first transmitting frequency assigned to another subscriber and a first receiving frequency assigned to said other subscriber, memory means at said each subscriber station to store therein data indicative of transmit and receive frequencies at which said each subscriber station is operating with, apart from those respectively assigned thereto, means associated with one of said stations for transmitting said stored frequencies to any other subscriber station, to enable that another station to select said frequencies associated with said another subscriber, whereby any number of subscribers can communicate in a conference mode with said another subscriber being the nexus of said conference as having all subscribers transmitting and receiving on said frequencies assigned to said nexus subscriber.

8. In the frequency division multiplex communication system according to claim 7 further comprising:

first mixer means at each one station for generating a virtual carrier at the transmitter assigned frequency, second mixer means at each another station for mixing any said transmitter assigned frequency and said predetermined frequency and for generating said upper and lower sidebands, and filter means for deriving an audio signal from at least one of the outputs of said second mixer means.

9. In the frequency division multiplex communication system according to claim 7 wherein communications between subscribers are provided on said upper sidebands of the output of said mixer means and signaling on said lower sidebands of the output of said mixer means.

10. In a frequency division multiplex communication system according to claim 7 wherein each subscriber station includes synthesizer means for generating said predetermined frequency and means coupled to said synthesizer for generating said transmitted frequency of said nexus subscriber.

11. A method for conferencing a plurality of subscribers in a frequency division multiplex system, comprising the steps of:

coupling a plurality of subscribers to a transmission path, each subscriber having paired assigned transmitting and receiving frequencies, with each pair related by a fixed frequency separation being the difference in intermediate frequencies used in generating of the transmitting and receiving frequencies, mixing a synthesized frequency with said intermediate frequencies to derive an independent sideband signal such that one sideband thereof contains communication information and the other signaling information, filtering undesired mixing products to propagate any desired upper and lower sideband signals, coupling a common reference frequency to said transmission path, together with said independent sideband signals to allow any subscriber to communicate with another, storing at one subscriber location any selected, transmitted and received frequencies different from those assigned to said subscriber, and transmitting said stored frequencies to any requesting subscriber to enable said requesting subscriber to tune to said selected different frequencies as stored.

12. The method according to claim 11 further including:

signaling a desired subscriber for determining whether said subscriber is communicating with another subscriber, returning a busy status signal from said desired subscriber indicative of communications with said another subscriber.

13. The method according to claim 12 wherein the steps of signaling and returning of status signals are accomodated on said lower sideband signals.

14. The method according to claim 13 further including the step of overriding said status signal when indicative of a communication with said another subscriber by transmitting an override signal to enable conferencing.

15. A method for conferencing a plurality of subscribers in a multiplex communication system comprising the steps of:

coupling a plurality of subscribers to a common transmission path, connecting at least two of said subscribers via said path to enable communication therebetween, storing in a memory at one of said subscriber locations the assigned transmitting and receiving frequencies indicative of the location of said other subscriber, transmitting said frequencies as stored to any other subscriber calling said one subscriber, to enable said calling subscriber to call said other subscriber, connecting said calling subscriber to said other subscriber.

16. The method according to claim 15 wherein said communication system is a frequency division multiplex system, with each subscriber having predetermined assigned transmitting and receiving frequencies.

17. The method according to claim 15 further including the step of storing in a memory at said calling subscriber location said assigned frequencies of the location of said other subscriber, to thereby enable each calling subscriber to have said assigned frequencies stored in memory whereby said other subscriber is the nexus of said conference.

18. The method according to claim 15 wherein said common transmission path is a coaxial cable.

19. The method according to claim 17 wherein the step of connecting said subscribers for communication therebetween is accommodated by generating upper sideband signals, while the step of transmitting said stored data is accommodated by generating lower sideband signals.

* * * * *